W. W. HOLMES.
EDUCATIONAL DEVICE.
APPLICATION FILED OCT. 10, 1914.

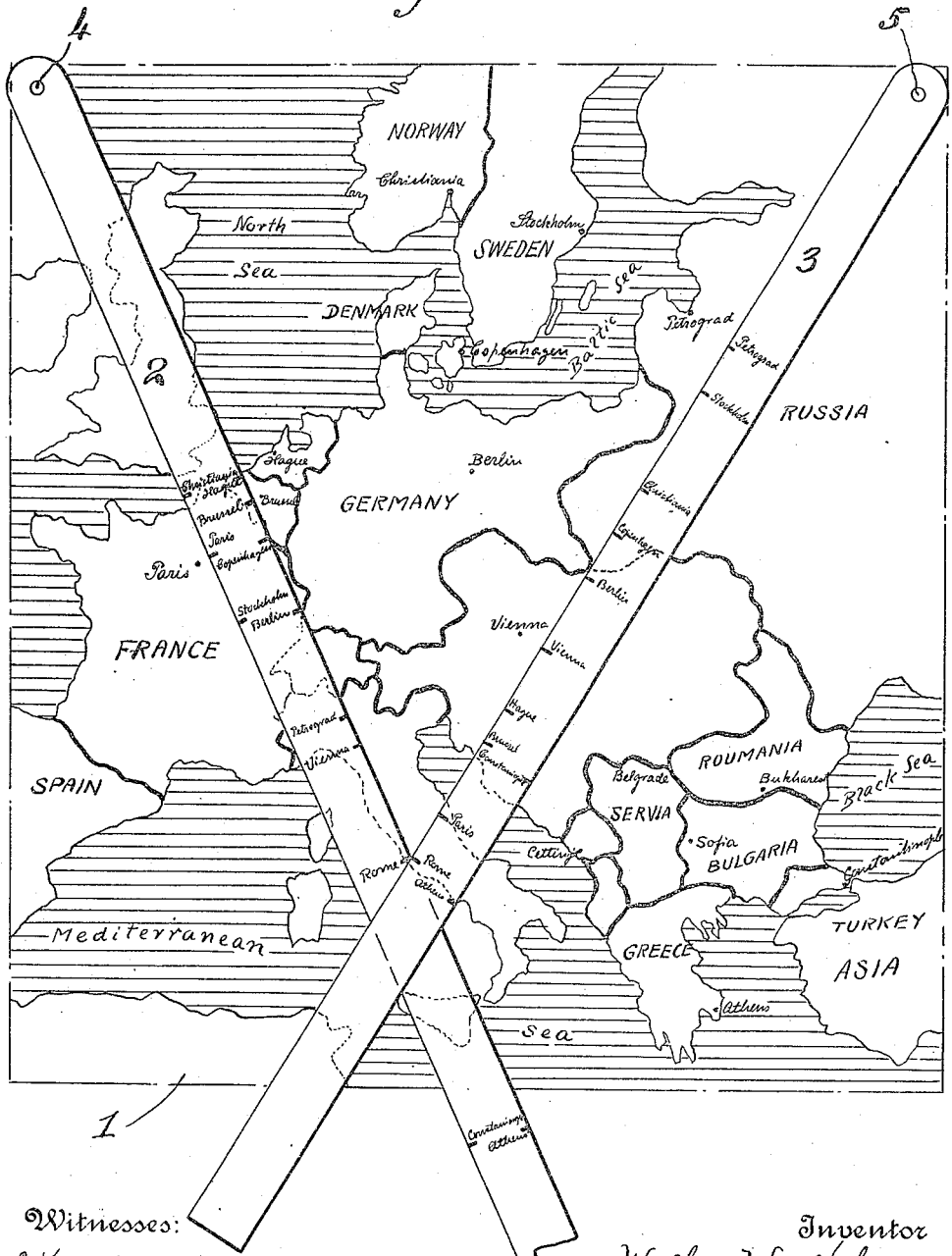

1,170,537.

Patented Feb. 8, 1916.
2 SHEETS—SHEET 2.

Witnesses:

Inventor
Walter W. Holmes
By his Attorneys

UNITED STATES PATENT OFFICE.

WALTER W. HOLMES, OF WATERBURY, CONNECTICUT.

EDUCATIONAL DEVICE.

1,170,537.  Specification of Letters Patent.  Patented Feb. 8, 1916.

Application filed October 10, 1914. Serial No. 865,992.

*To all whom it may concern:*

Be it known that I, WALTER W. HOLMES, a citizen of the United States of America, and a resident of Waterbury, county of New Haven, State of Connecticut, have invented certain new and useful Improvements in Educational Devices, of which the following is a specification.

This invention relates to a device for educational and instructional purposes whereby desired point or points may be located from two or more main points by means of locating elements pivotally or otherwise movably connected at such main points. For example, my invention may be applied to an educational device for locating a city on a map. In one form of my invention, such map may have the place of location of the city in question previously indicated thereon, and by the use of the aforesaid movable elements such place of location of the city will be ascertained readily and with certainty. In other forms of my invention, the general contour of the country or countries will have been indicated on the map and the place of location of the city in question will be determined by the use of the aforesaid movable elements. In the usual forms of my invention, the movable elements are two strips preferably pivoted at two main points. Such main points may be the places of location of two principal cities, or two points located substantially at extreme points of the map, such as the upper left hand and upper right hand corners of the map. Such map need not be drawn in a plane, but may be in the form of a globe or other curved map.

To illustrate one form of my invention applied to a terrestrial map, we will assume the map to be a map of Europe and one strip pivoted at the point of location of London and the other strip pivoted at the location of Petrograd. On the London strip will be indicated the names of the points desired to be located and indications of the air line or corresponding distances of such points from London. On the Petrograd strip will be indicated the names of the same points desired to be located and similar indications of the distances of such points from Petrograd. Thus, to locate Rome, the London strip and the Petrograd strip are moved toward one another until the Rome indication on the London strip coincides with the Rome indication on the Petrograd strip, the intersection giving the point of location of Rome.

Other features and objects of my invention will be more fully understood from the following description and the accompanying drawings, in which—

Figure 3:
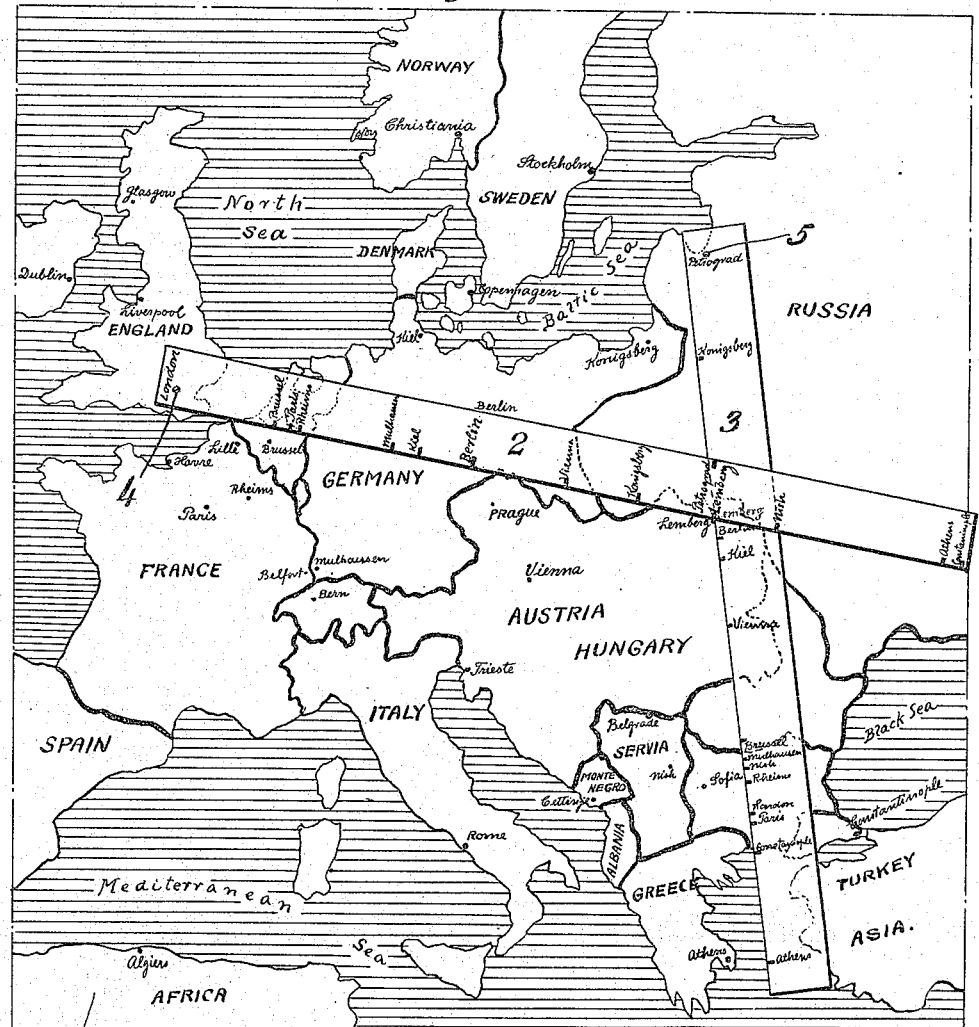
Figure 2:
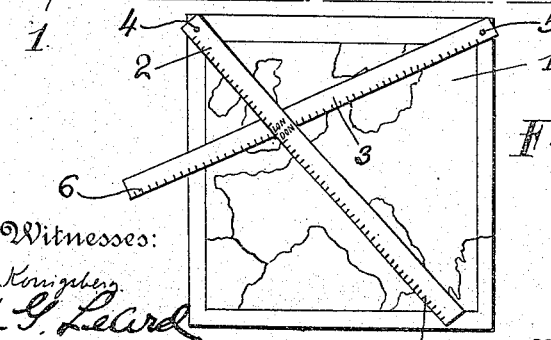

Figure 1 shows one form of an educational device showing the locating strips to be attached at the upper right hand and upper left hand corners of the map; Fig. 2 shows a somewhat similar form and indicates the use of the movable elements for determining the positions of desired points on the map; and Fig. 3 shows a modified form wherein London and Petrograd strips are employed.

The map indicated in Fig. 1 is a map of Europe; such map may be printed or drawn directly on the face of base 1 of the device or on paper or the like affixed to the face of said base 1. The strip 2 is shown pivoted at 4 to the upper left hand corner of the map and the strip 3 is shown pivoted at 5 to the upper right hand corner of the map. Such pivoting may be effected by inserting a pin through strips 2 and 3 and seated in the base 1, or by means of other suitable fastening means. On strip 2 are indicated in succession, in accordance with the respective air line distances, the cities Christiania, Hague, Brussels, Paris, etc. Similarly, on the strip 3 are arranged the names of the places indicated on strip 2 but in the order of their respective air line distances. Thus, on strip 3 are arranged in proper order Petrograd, Stockholm, Christiania, Copenhagen, etc. The illustrated positions of the strips 2, 3, indicate the procedure for finding Rome on the map. In this case, the strips 2 and 3 will have been moved about their respective pivotal points 4, 5, until the Rome indication on strip 2 coincides with the Rome indication on strip 3, thereby giving the point of location of Rome on the map. Now, if it is desired to locate Berlin, strip 2 will be swung toward the right and strip 3 will be swung toward the left until the Berlin indication on strip 2 coincides with the Berlin indication on strip 3.

It will be noted that the several indications on strips 2, 3, are arranged proximate both edges, thereby affording use of both edges of each strip. If the space on one face of each strip does not provide sufficient room for the number of points desired to be located the opposite face of the strip may be also employed, in which case the pivotal means will be selected to adapt the strip to be readily reversed.

Fig. 2 illustrates the application of my invention to determining cities and other points on a map showing the general boundaries of the several countries. The map of Fig. 2 is a map of the boundaries of a portion of Europe whereon none of the cities has been indicated. Thus, to locate London, the London indication on strip 2 is brought into coincidence with the London indication on strip 3 and the point of intersection indicated on the map as by means of a pencil or the like, thus giving the place of location of London. The determination of other cities and points on the map will be effected in a similar manner. The strips 2, 3 are shown provided with indications 6 of the air line distances in miles or other units of the respective cities or other points from their respective pivotal points of the strips.

Fig. 3 illustrates a modification in which the strip 2 is pivotally connected at the point of location of London and the strip 3 is pivotally connected at the point of location of Petrograd. The illustrated positions of strips 2, 3, indicate the procedure for determining the location of Lemberg on a map which is being completed in the aforesaid manner or for locating Lemberg on a map on which the point of location of Lemberg was previously printed. If it is desired to employ a globe such strips 2, 3 will be pivotally connected at properly related points and the strips 2, 3, curved in correspondence to the curvature of the globe. Such arrangement will be applicable for terrestrial globes and also for celestial globes. It will be clear that my invention is applicable for locating any desired point or points on any plane or curved surface by means of two movable elements respectively bearing indications of such point or points.

Whereas I have described my invention by reference to specific forms thereof, it will be understood that many changes and modifications may be made without departing from the spirit of my invention.

What I claim and desire to secure by Letters Patent is:—

1. In an educational device, the combination of a surface bearing a map, a strip movably connected at a certain point on said surface and having indications of desired points thereon and a second strip movably connected at another certain point on said surface and bearing corresponding indications of said points.

2. In an educational device, the combination with a surface bearing a map, of a strip pivotally connected thereto at a certain point, indications of desired points arranged on said strip in the order of their respective straight line distances from said certain point, a second strip pivotally connected at another certain point to said surface and indications on said second strip of said desired points arranged in the order of their respective straight line distances from said another certain point.

3. In an educational device, the combination with a surface bearing a map, of a strip extending in a surface corresponding to said map surface, said strip being pivotally connected thereto at a certain point, indications of desired points arranged on said strip, a second strip extending in a surface corresponding to said map surface, said second strip being pivotally connected to said map surface, and indications on said second strip corresponding to said desired points.

4. In an educational device, the combination with a surface bearing a map, of strips extending in a surface corresponding to said map surface, means for pivotally connecting said strips at predetermined points on said map surface and names of points arranged on said strips at certain spaced distances corresponding to points desired to be located on said map.

5. In an educational device, the combination with a map surface, of a strip extending in a surface corresponding to said map surface, means for pivotally connecting said strip to said map surface at a predetermined point, a second strip extending in a surface corresponding to said map surface, means for pivotally connecting said second strip to said map surface at a second predetermined point, indications on said first strip of desired points arranged relatively to one another in accordance with the respective distances of said desired points from said predetermined point and indications on said second strip of said desired points arranged relatively to one another in accordance with the respective distances of said desired points from said second predetermined point.

In testimony whereof I have signed this specification in the presence of two subscribing witnesses.

WALTER W. HOLMES.

Witnesses:
K. G. Le Ard,
S. M. Baeder.